(12) United States Patent
Andreasch et al.

(10) Patent No.: US 11,541,478 B2
(45) Date of Patent: Jan. 3, 2023

(54) LASER WELDING DEVICE AND LASER WELDING METHOD USING WELDING WIRE

(71) Applicant: TRUMPF Werkzeugmaschinen GmbH + Co. KG, Ditzingen (DE)

(72) Inventors: Wolfgang Andreasch, Weinstadt (DE); Moritz Berger, Ditzingen (DE); Patrick Weber, Kornwestheim (DE); Martin Johannes Geiger, Guenzburg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 150 days.

(21) Appl. No.: 16/267,484

(22) Filed: Feb. 5, 2019

(65) Prior Publication Data

US 2019/0168342 A1    Jun. 6, 2019

Related U.S. Application Data

(63) Continuation of application No. PCT/EP2017/069818, filed on Aug. 4, 2017.

(30) Foreign Application Priority Data

Aug. 5, 2016 (DE) .......................... 102016214562.2

(51) Int. Cl.
*B23K 26/211* (2014.01)
*B23K 26/70* (2014.01)
(Continued)

(52) U.S. Cl.
CPC ............ *B23K 26/211* (2015.10); *B23K 9/124* (2013.01); *B23K 26/0884* (2013.01);
(Continued)

(58) Field of Classification Search
CPC .. B23K 26/211; B23K 26/70; B23K 26/0884; B23K 26/32; B23K 26/1464
(Continued)

(56) References Cited

U.S. PATENT DOCUMENTS 4,441,012 A * 4/1984 Risbeck ................. B23K 9/124
219/130.51
9,085,041 B2 * 7/2015 Peters ................. B23K 35/0261
(Continued)

FOREIGN PATENT DOCUMENTS

CN    102500934 A    6/2012
CN    202804490 U    3/2013
(Continued)

OTHER PUBLICATIONS

Machine English Translation of DE 4412093A1, Specification (Year: 1995).*
(Continued)

*Primary Examiner* — Sang Y Paik
*Assistant Examiner* — Erwin J Wunderlich
(74) *Attorney, Agent, or Firm* — Fish & Richardson P.C.

(57) ABSTRACT

Devices for laser welding using welding wire have a welding head, a wire guide for the welding wire, and a wire feed drive. The welding wire can be moved by the wire feed drive during a welding process with a feed movement in a feed direction, guided by the wire guide. A positioning device has a positioning drive, by which the welding wire is moved in an oscillating manner in the longitudinal direction of the welding wire, when a wire end of the welding wire is arranged in a welding readiness position. Methods for laser welding using a welding wire as added material are carried out using the devices. A control program controls the devices. The devices for laser welding can be provided as a part of a welding robot.

5 Claims, 2 Drawing Sheets

(51) Int. Cl.
  *B23K 9/12* (2006.01)
  *B23K 26/14* (2014.01)
  *B23K 26/08* (2014.01)
  *B23K 26/32* (2014.01)

(52) U.S. Cl.
  CPC .......... *B23K 26/1464* (2013.01); *B23K 26/32* (2013.01); *B23K 26/70* (2015.10)

(58) Field of Classification Search
  USPC .................................................. 219/121.64
  See application file for complete search history.

(56) References Cited

U.S. PATENT DOCUMENTS

| | | | | |
|---|---|---|---|---|
| 10,464,168 | B2 * | 11/2019 | Matthews | ............ B23K 26/211 |
| 2001/0013509 | A1 | 8/2001 | Haschke | |

FOREIGN PATENT DOCUMENTS

| | | | | |
|---|---|---|---|---|
| CN | 103406675 | A | | 11/2013 |
| CN | 103817455 | A | | 5/2014 |
| DE | 4320405 | A1 | | 12/1994 |
| DE | 4412093 | A1 * | | 10/1995 |
| DE | 19732379 | A1 | | 2/1999 |
| DE | 20 204 395 | U | | 7/2002 |
| JP | H04344873 | | | 1/1992 |
| JP | 2001105163 | A * | 4/2001 | ............ B23K 26/14 |
| JP | 2005-081403 | A | | 3/2005 |
| JP | 2011-062728 | A | | 3/2011 |
| JP | 2011062728 | A * | 3/2011 | ............ B23K 26/04 |
| JP | 2011-218423 | A | | 11/2011 |
| WO | WO-2015098463 | A1 * | 7/2015 | ............ B23K 26/14 |

OTHER PUBLICATIONS

Machine English Translation of JP-2011062728A (Year: 2011).*
Machine English Translation of JP-2001105163-A (Year: 2001).*
Machine English Translation of WO-2015098463-A1 (Year: 2015).*
CN Office Action in Chinese Appln. No. 201780049191.2, dated Apr. 23, 2020, 25 pages (with English translation).
International Search Report and Written Opinion in International Application No. PCT/EP2017/069818, dated Nov. 22, 2017, 24 pages (with English translation).
CN Office Action in Chinese Appln. No. 201780049191.2, dated Feb. 26, 2021, 23 pages (with English translation).
EP Office Action in European Appln. No. 17749695.7, dated Feb. 22, 2022, 12 pages (with English translation)

* cited by examiner

LASER WELDING DEVICE AND LASER WELDING METHOD USING WELDING WIRE

CROSS REFERENCE TO RELATED APPLICATIONS

This application is a continuation of and claims priority under 35 U.S.C. § 120 from PCT Application No. PCT/EP2017/069818 filed on Aug. 4, 2017, which claims priority from German Application No. DE 10 2016 214 562.2, filed on Aug. 5, 2016. The entire contents of each of these priority applications are incorporated herein by reference.

TECHNICAL FIELD

The disclosure relates to devices for laser welding using added material, such as welding wire. The disclosure also relates to welding methods that can be carried out using devices as described above and a control program for carrying out the methods.

BACKGROUND

Laser welding has established itself as an alternative to conventional welding methods, such as gas welding and arc welding. Laser welding is performed with or without added material depending on the type of seam to be welded and how large the gap is between the components intended to be connected to one another.

A generic device for laser welding is offered by the company TRUMPF (address: Johann-Maus-Straße 2, 71254 Ditzingen, Germany) under the name "TruLaser Robot 5020". The known device is used to carry out a generic welding method.

A welding wire is unwound from a supply roll on the welding device of the prior art by a wire feed drive and fed in a feed direction to the welding point. In the process, the welding wire is first moved with the wire end leading in the feed direction into a welding readiness position prior to the start of the welding process. Starting from the welding readiness position of the leading wire end, the welding wire is then delivered by the wire feed drive in the feed direction during the welding process as a function of the progress of the weld seam and the associated consumption of the added material of the welding wire. To achieve an optimal welding result, the leading wire end of the welding wire must be arranged in the welding readiness position defined with respect to the welding point on the relevant workpiece or workpieces at the start of the welding process. To this end, the welding readiness position of the leading wire end is established in relation to a wire nozzle of the welding device, from which wire nozzle the welding wire exits toward the welding point and which wire nozzle guides the welding wire during its feed movement together with a flexible guide tube, which in turn is situated on the side of the weld nozzle facing toward the supply roll.

Movement resistance opposing the feed movement of the welding wire at the guide tube and/or at the wire nozzle due to friction, can cause the welding wire to become compressed inside the wire guide and to become tensioned as a result. If, after completion of the welding process and before the start of another welding process, this tension is reduced in an uncontrolled manner, the welding wire then executes an undefined movement in the feed direction relative to the wire guide. The wire end of the welding wire leading in the feed direction arrives in a position that differs from the desired welding readiness position relative to the wire nozzle and, thus, also relative to the welding point on the component or components to be welded during the subsequent welding process. Such a mispositioning of the wire end leading in the feed direction can adversely affect the result of the subsequent welding process.

SUMMARY

The disclosure relates to devices for laser welding using added material such as welding wire, having a welding head, by which a laser beam generated by a beam source can be directed as a laser welding beam at a welding point, having a wire guide for the welding wire, having a wire feed drive, by which the welding wire is movable during a welding process relative to the wire guide with a feed movement in a feed direction extending in the longitudinal direction of the wire, wherein the welding wire is guided during the feed movement in the feed direction by the wire guide, and having a positioning device for the welding wire, by which a wire end of the welding wire, which leads in the feed direction, can be arranged in a welding readiness position on the device for laser welding, wherein the leading wire end in the welding readiness position can be arranged at the start of the welding process in a desired position relative to the welding point.

Advantages of the current disclosure include increasing the functional reliability of the previously known laser welding devices and of the previously known laser welding methods.

The welding wire is set in an oscillating motion in the longitudinal direction of the wire by a positioning drive of the positioning device for arranging the wire end leading in the feed direction, in the welding readiness position. Due to the oscillating movement of the welding wire, any tension of the welding wire that has built up, for example, during the course of a preceding welding process or due to a repositioning after completion of the preceding welding process, is reduced in a controlled manner. This reduction is before the wire end of the welding wire is arranged in a position relative to the wire guide and relative to a welding point in the wire longitudinal direction, starting from which position the subsequent welding process can be carried out with optimum results. An undefined position of the wire end of the welding wire at the start of a welding operation, can be avoided in this manner.

The concepts described herein are particularly advantageous for multi-axial welding robots, on which the wire guide is moved in different, potentially frequently alternating directions when carrying out welding processes and/or when repositioning the welding head. Thus there is an increased risk of tension building up on the welding wire inside the wire guide, the uncontrolled reduction of which would result in a mispositioning of the wire end of the welding wire leading in the feed direction that adversely affects the subsequent welding process.

The numeric control programs described herein comprise control instructions, on the basis of which the components of the devices described herein used for carrying out the methods are appropriately controlled by a numeric control device.

In some embodiments of the present disclosure, both the feed movement of the welding wire when carrying out a welding process, and the oscillating wire movement used to situate the wire end of the welding wire in the welding readiness position are carried out by means of one and the same drive device. The feed movement of the welding wire during a welding process is often generated by a drive, which, in addition to a first drive unit close to a welding wire supply, includes a second drive unit, which is offset toward the welding point relative to the first drive unit. The second drive unit of such a drive device, by also undertaking the placement of the wire end leading in the feed direction in the welding readiness position, makes a relatively large space between the drive unit and the welding point possible due to the relaxed state of the welding wire during the positioning of the leading wire end. This avoids an interfering contour otherwise produced by the drive unit near the welding point.

In some embodiments, the welding wire, while moving in an oscillating manner in the longitudinal direction of the welding wire, is moved in the feed direction into a position in which it projects beyond the welding readiness position of the leading wire end. The welding wire is then cut by a separating device in such a way that the wire end of the welding wire is clearly situated in the welding readiness position.

To move the welding wire beyond the welding readiness position of the leading wire end, the welding wire may be moved initially over a relatively long path length solely in the feed direction and subsequently to a lesser extent in an oscillating manner in the feed direction and in the opposite direction.

In some embodiments, the working optics of the welding head are used as a separating device for producing a wire end of the welding wire arranged in a defined welding readiness position, by which working optics the welding operation following the positioning of the leading wire end of the welding wire can also be carried out. The beam source that generates the laser beam for welding can also be used to generate the laser separating beam by which the welding wire projecting beyond the welding readiness position is cut. To this end, the beam source can be selectively operated in a welding mode or in a separating mode.

In some embodiments, the welding wire projecting beyond the welding readiness position and the separating device, and optionally the welding head, are moved into a specific separating position for cutting the welding wire. In this separating position particular precautions can be taken for the separating process to be carried out.

DETAILED DESCRIPTION

Figure 1:
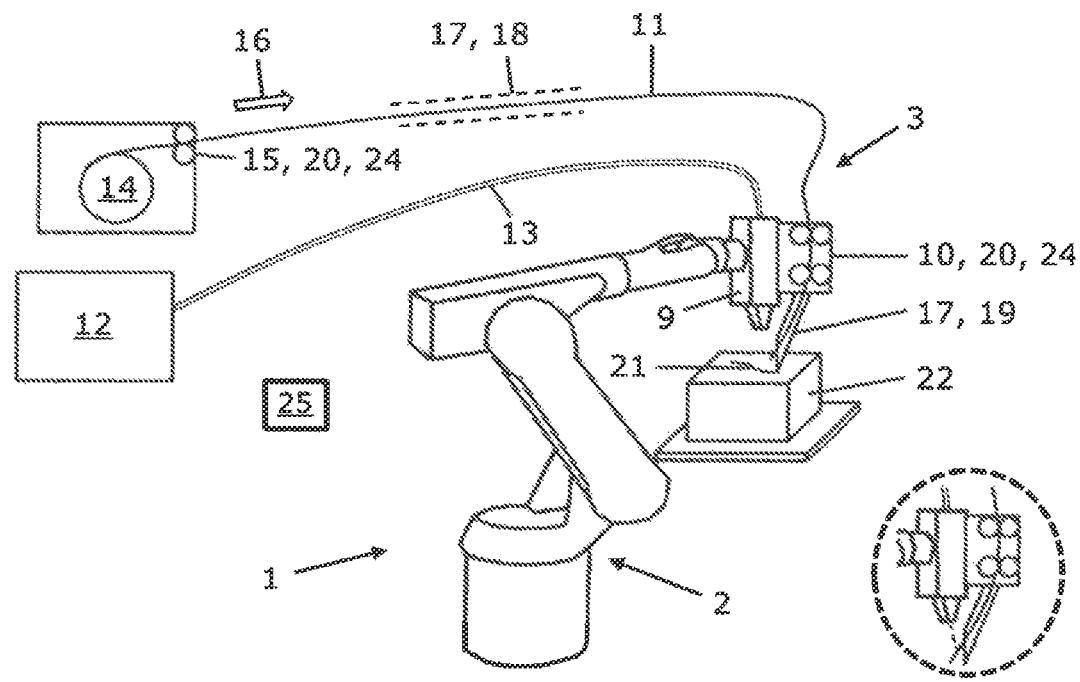
FIG. 1 shows an example of a welding robot as described herein including a device for laser welding with added material in the form of a welding wire.
Figure 2:
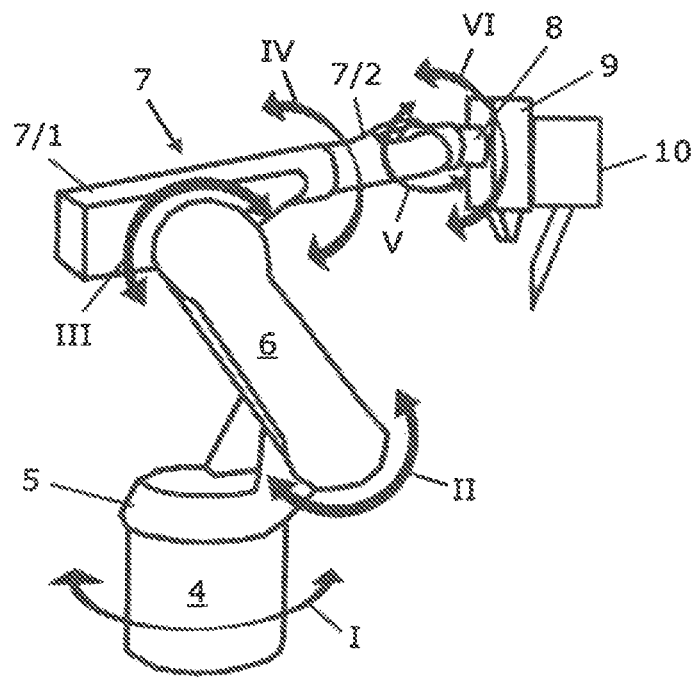
FIG. 2 shows the welding robot of FIG. 1 with its movement axes.

FIGS. 1 and 2 show a welding robot 1 that includes a manipulator 2, as well as a welding device 3. The manipulator 2 comprises a base 4, a carousel 5, a swinging member 6, an arm 7, and a hand 8. The carousel 5, together with the remaining components of the manipulator 2, is rotatably mounted on the stationary base 4 about a vertical axis in the direction of a double arrow I. The carousel 5 in turn supports the swinging member 6 in a pivotal manner about a horizontal axis (double arrow II). Also pivotable about a horizontal axis is the arm 7 relative to the swinging member 6 (double arrow III). A part 7/1 of the arm 7 on the swinging member side supports a part 7/2 of the arm 7 on the hand side rotatable in the direction of a double arrow IV. At the end of the part 7/2 of the arm 7 remote from the swinging member 6, the hand 8 is mounted for pivotable movement in the direction of double arrow V and mounted for rotational movement in the direction of the double arrow VI. The manipulator 2 therefore has 6 movement axes.

Attached to the hand 8 of the manipulator 2 are a welding head 9 as well as a drive unit 10 near the welding point. The welding head 9 and the drive unit 10 near the welding point are components of the welding device 3. The welding device 3 is a device for laser welding using added material, e.g., welding wire 11.

A laser beam is fed via a laser light cable 13 to the welding head 9 and is generated by a beam source 12 of the welding device 3. The beam source 12 in the example depicted is a conventional solid-state laser. The beam source 12 can be selectively operated in a welding mode or in a separating mode. Working optics of a conventional type are housed inside the welding head 9, and emit a laser beam generated by the beam source 12 as a laser welding beam or as a laser separating beam, depending on the operating mode of the beam source 12.

A supply of the welding wire 11 is wound on a supply roll 14 inside a housing. From the supply roll 14, the welding wire 11 is continuously unwound during a welding process by a drive unit 15 on the supply side and of the drive unit 10 near the welding point, and moved in a feed direction extending in the longitudinal direction of the wire and illustrated by an arrow 16 in FIG. 1. During its movement in the feed direction 16, the welding wire 11 is guided by a wire guide 17 which, in turn, comprises a flexible guide tube 11 in the form of a so-called "core" 18, as well as a wire nozzle 19 mounted on a housing of the drive unit 10 near the welding point.

During a welding operation, the drive unit 10 near the welding point and the drive unit 15 on the supply side together form a wire feed drive 20. To create weld seam 21 on the workpiece 22, the wire feed drive 20 delivers the welding wire 11 in the feed direction 16 relative to a welding point on the workpiece 22 as a function of the progress of the weld seam and of the associated consumption of the welding wire 11 fed as added material. As a result of the laser welding beam directed by the welding head 9 at the welding point, the welding wire 11 is melted at a point, the position of which is defined relative to the wire nozzle 19 of the wire guide 17 and selected in such a way that an optimal welding result is achieved by the laser welding beam emitted toward the welding wire 11.

Once the weld seam 21 is completed, the beam source 12 is switched off and the wire feed drive 20 is shut down. Immediately thereupon, the end of the welding wire 11 projecting from the wire nozzle 19 in the feed direction 16, which leads in the feed direction 16 and which has been created by the laser welding beam upon conclusion of the preceding welding operation, is located in a defined welding readiness position relative to the wire nozzle 19. From this welding readiness position a subsequent welding process could be started and an optimal welding result achieved.

There is the possibility, however, that during the course of the preceding welding operation, the welding wire 11 has become tensioned in its longitudinal direction inside the wire guide 17, for example, due to process-related movements of the wire guide 17. A corresponding effect can occur if, for example, an additional weld seam is to be created at another point on the workpiece 22. The welding head 9, together with the drive unit 10 near the welding point, with the wire nozzle 19 mounted on the drive unit and with the welding wire 11 guided inside the wire nozzle 19 accordingly must be repositioned on the workpiece 22. The welding wire 11 can also become improperly tensioned or compressed inside the wire guide 17 in the longitudinal direction of the wire, due to the movements of, inter alia, the wire guide 17, executed by the manipulator 2 for such repositioning purpose, as illustrated in the sectional view (1) of FIG. 3.

Figure 3:
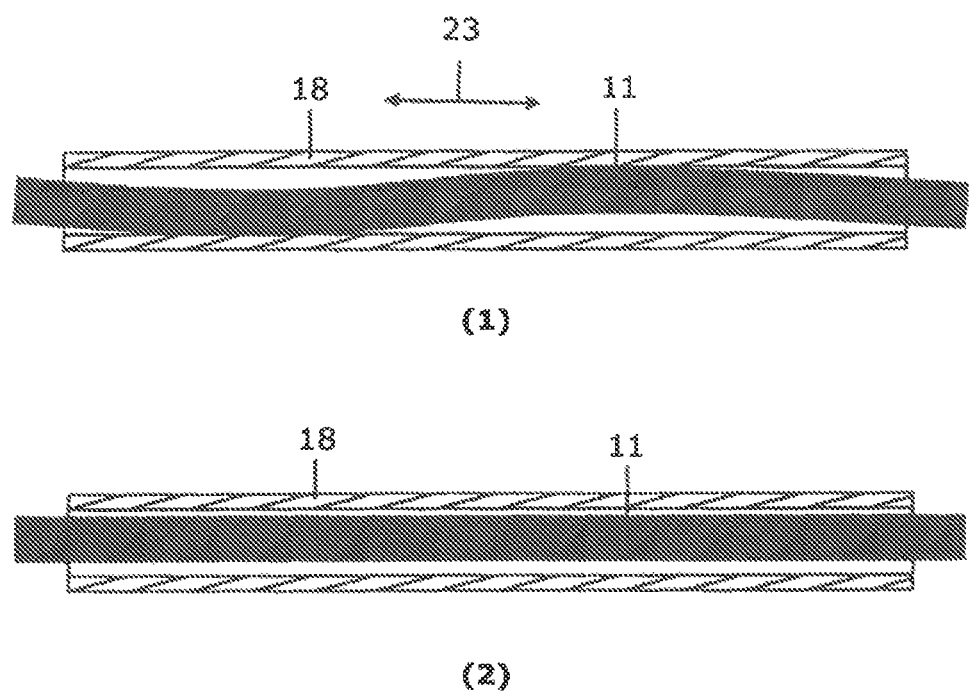
FIG. 3 shows the welding wire of the welding robot of FIGS. 1 and 2 inside the wire guide indicated in FIG. 1.

Uncontrolled relaxation of the welding wire 11 in the state of tension of the sectional view (1) of FIG. 3 would result in the leading wire end of the welding wire 11 initially still situated in the welding readiness position executing an undefined movement in the feed direction 16 relative to the wire nozzle 19. As a result, the leading wire end of the welding wire 11 would arrive in a position for which a subsequent processing of the welding wire 11 by the laser welding beam would not produce an optimal weld result.

To avoid such a mispositioning of the wire end of the welding wire 11, which leads in the feed direction 16, the welding wire 11 is caused to relax after completion of a welding operation and prior to the start of a subsequent welding process. This is achieved by moving the welding wire 11 in an oscillating manner in the longitudinal direction of the wire as shown by a double arrow 23 in the sectional view (1) of FIG. 3 by the drive unit 10 near the welding point and by the drive unit 15 on the supply side. The welding wire 11 is transferred by the drive units 10, 15, functioning in this respect as a positioning drive 24, from the state of tension of the sectional view (1) of FIG. 3 into the state of tension illustrated in the sectional view (2) of FIG. 3. In the sectional view (2) of FIG. 3, the welding wire 11 is relaxed in the longitudinal direction of the wire and therefore straightened as compared to the conditions of sectional view (1).

A relaxation and straightening of the welding wire 11 is desirable in the region between the drive unit 10 near the welding point and the wire nozzle 19. A lax welding wire 15 in the region between the drive unit 10 near the welding point and the drive unit 15 on the supply side can potentially even be advantageous.

Due to the straightening of the welding wire 11, the end of the welding wire 11 leading in the feed direction 16 close to the end of the wire nozzle 19 on the processing side moves in the feed direction 16 beyond the welding readiness position, in which the wire end must be arranged at the beginning of the next welding process. The partial length, with which the welding wire 11 projects beyond the welding readiness position of the wire end leading in the feed direction 16, is removed by separating processing the welding wire 11. This method step is illustrated framed in dashed lines in FIG. 1.

The beam source 12 is switched into the separating mode and accordingly generates a laser beam that due to its beam power acts as a laser separating beam at the welding wire 11 and cuts the welding wire 11 close to the wire nozzle 19 in such a way that the wire end of the (relaxed) welding wire 11 produced as a result of cutting is in the welding readiness position. The laser separating beam directed by the welding head 9 to the welding wire 11 is indicated by dashed lines in the sectional view of FIG. 1 framed in dashed lines.

To cut the welding wire 11 projecting in the feed direction 16 beyond the welding readiness position, it is possible for the manipulator 2 to move the welding head 9, as well as the drive unit 10 near the welding point with the wire nozzle 19 and with the welding wire 11 situated inside the wire guide 17, into a separating position remote from the workpiece 22. In this case, it must be ensured, however, that the movements for positioning the welding head 9 in a new processing position on the workpiece 22 to be executed after the welding wire 11 is cut, do not result in the welding wire 11 being improperly tensioned or compressed again inside the wire guide 17 and the wire end of the welding wire 11 leading in the feed direction 16 leaving the welding readiness position as a result.

To implement the foregoing sequences, the modules of the welding robot 1 are controlled by a numerical control unit 25 of the welding robot 1 indicated in FIG. 1. In this instance, a control program with corresponding control instructions runs on the numeric control unit 25.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:

1. A method for laser welding using welding wire as added material, the method comprising:
generating a laser beam by a beam source;
directing the laser beam by a welding head to a welding point;
moving the welding wire during a welding process relative to a wire guide comprising a wire nozzle arranged near the welding point by a wire feed drive with a feed movement in a feed direction extending in a longitudinal direction of the wire toward the welding point; and
after completion of the welding process and once a weld seam is completed, and prior to starting a subsequent welding process, switching off the beam source and, with the beam source switched off, positioning a wire end of the welding wire by a positioning device on a device for laser welding at a welding readiness position, the welding readiness position being a desired position in which the wire end is arranged relative to the welding point when the subsequent welding process is started to melt the welding wire;
wherein the wire end of the welding wire is positioned in the welding readiness position by moving the welding wire in the feed direction by a positioning drive of the positioning device until the wire end of the welding wire reaches a position where the welding wire projects in the feed direction beyond the welding readiness position, while, with the beam source switched off, oscillating the welding wire in the longitudinal direction of the welding wire relative to the wire guide in the feed direction and in the opposite direction during the movement of the welding wire in the feed direction until the wire end of the welding wire reaches the position where the welding wire projects in the feed direction beyond the welding readiness position, and by cutting the welding wire projecting in the feed direction beyond the welding readiness position by a separating device of the positioning device such that the wire end produced as a result of the cutting is in the welding readiness position, wherein the oscillating of the welding wire during the movement of the welding wire in the feed direction until the wire end of the welding wire reaches the position where the welding wire projects in the feed direction beyond the welding readiness position provides a relaxation and straightening of the welding wire between the positioning drive and the wire nozzle.

2. The method of claim 1,
wherein the wire feed drive further has a reversible feed direction, and
wherein the welding wire is moved by the wire feed drive during the welding process with the feed movement in the feed direction and oscillated in the longitudinal direction of the welding wire by moving the welding wire in the feed direction or in the opposite direction, and thereby relative to the wire guide during the movement of the welding wire into the position where the welding wire projects in the feed direction beyond the welding readiness position.

3. The method of claim 1, further comprising selectively operating the beam source in a welding mode or in a separating mode, and when the beam source is operated in the separating mode, the welding wire projecting in the feed direction beyond the welding readiness position is cut by the welding head such that the wire end produced as a result of the cutting is in the welding readiness position.

4. The method of claim 1, further comprising moving the welding wire and the separating device into a separating position remote from a workpiece exhibiting the welding point for cutting the welding wire projecting in the feed direction beyond the welding readiness position.

5. The method of claim 4, further comprising moving the welding head, being the separating device, to the separating position remote from the workpiece.

* * * * *